(12) United States Patent
Kelley et al.

(10) Patent No.: US 9,182,881 B2
(45) Date of Patent: *Nov. 10, 2015

(54) GUI POINTER AUTOMATIC POSITION VECTORING

(71) Applicant: International Business Machines Corporation, Armonk, NY (US)

(72) Inventors: Edward E. Kelley, Wappingers Falls, NY (US); Franco Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 158 days.

This patent is subject to a terminal disclaimer.

(21) Appl. No.: 13/945,232

(22) Filed: Jul. 18, 2013

(65) Prior Publication Data

US 2013/0305193 A1   Nov. 14, 2013

Related U.S. Application Data

(63) Continuation of application No. 10/905,853, filed on Jan. 24, 2005, now Pat. No. 8,566,751.

(51) Int. Cl.
   *G06F 3/0481* (2013.01)

(52) U.S. Cl.
   CPC .................. *G06F 3/04812* (2013.01)

(58) Field of Classification Search
   CPC ........................................ G06F 3/0481
   USPC .................................. 715/857, 858
   See application file for complete search history.

(56) References Cited

U.S. PATENT DOCUMENTS

| 5,298,890 | A  | 3/1994  | Kanamaru et al. |
| 5,870,079 | A  | 2/1999  | Hennessy |
| 6,031,531 | A  | 2/2000  | Kimble |
| 6,266,043 | B1 | 7/2001  | Robin |
| 6,317,116 | B1 | 11/2001 | Rosenberg et al. |
| 6,587,131 | B1 | 7/2003  | Nakai et al. |
| 6,693,653 | B1 | 2/2004  | Pauly |
| 6,717,600 | B2 | 4/2004  | Dutta et al. |

(Continued)

FOREIGN PATENT DOCUMENTS

JP          03-048922           1/1991

OTHER PUBLICATIONS

U.S. Appl. No. 10/905,853, filed Jan. 24, 2005, Office Action Communication, Aug. 27, 2007, 15 pages.

(Continued)

*Primary Examiner* — Matthew Ell
(74) *Attorney, Agent, or Firm* — Gibb & Riley, LLC

(57) ABSTRACT

A method and computer system for rapid and accurate automatic vectoring of a graphical user interface pointer to a selectable item on a display. Based upon pointer movement input from a pointing device (e.g., a mouse, touchpad or specially configured keyboard), a direction of travel vector from an initial anchor position towards a target item is determined. The location of the target item is extrapolated and the pointer is automatically moved to that target item. To ensure that the pointer moves to the intended target item, the location of the target item is extrapolated based upon the direction of travel vector and default and/or user defined parameters. Optional user defined parameters include initial pointer anchor position, vector sensitivity, automatic selection of target item, and user defined pointer limitations.

20 Claims, 8 Drawing Sheets

(56) References Cited

U.S. PATENT DOCUMENTS

| | | |
|---|---|---|
| 6,765,598 B2 | 7/2004 | Kim |
| 6,980,215 B2 | 12/2005 | Chupeau et al. |
| 7,231,609 B2 | 6/2007 | Baudisch |
| 2002/0003529 A1 | 1/2002 | Takase et al. |
| 2005/0028112 A1 | 2/2005 | Iijima |
| 2007/0018966 A1 | 1/2007 | Blythe et al. |

OTHER PUBLICATIONS

U.S. Appl. No. 10/905,853, filed Jan. 24, 2005, Office Action Communication, Feb. 25, 2008, 12 pages.

U.S. Appl. No. 10/905,853, filed Jan. 24, 2005, Office Action Communication, May 14, 2008, 9 pages.

U.S. Appl. No. 10/905,853, filed Jan. 24, 2005, Office Action Communication, Nov. 12, 2008, 12 pages.

U.S. Appl. No. 10/905,853, filed Jan. 24, 2005, Advisory Action Communication, Jan. 30, 2009, 3 pages.

U.S. Appl. No. 10/905,853, filed Jan. 24, 2005, Office Action Communication, Feb. 19, 2009, 11 pages.

U.S. Appl. No. 10/905,853, filed Jan. 24, 2005, Office Action Communication, Aug. 4, 2009, 14 pages.

U.S. Appl. No. 10/905,853, filed Jan. 24, 2005, Advisory Action Communication, Nov. 6, 2009, 4 pages.

U.S. Appl. No. 10/905,853, filed Jan. 24, 2005, Examiner's Answer Communication, Apr. 14, 2010, 20 pages.

U.S. Appl. No. 10/905,853, filed Jan. 24, 2005, Board Decision Communication, Feb. 25, 2013, 9 pages.

U.S. Appl. No. 10/905,853, filed Jan. 24, 2005, Notice of Allowance Communication, Jun. 17, 2013, 8 pages.

GUI POINTER AUTOMATIC POSITION VECTORING

CROSS-REFERENCE TO RELATED APPLICATIONS

This application is a continuation of U.S. Pat. No. 8,566,751 issued on Oct. 22, 2013, the complete disclosure of which, in its entirety, is herein incorporated by reference.

BACKGROUND OF THE INVENTION

1. Field of the Invention

The present invention relates generally to graphical user interfaces and more particularly to a method and system for vectoring a pointer to a target item on a graphical user interface display.

2. Description of the Related Art

A Graphical User Interface (GUI) is a computer program designed to allow a computer user to interact easily with the computer. GUI systems such as Microsoft Windows® and Apple Macintosh® include the following basic features: a display screen, a pointer, selectable items and a pointing device. The pointer (also sometimes referred to as a cursor) is a small symbol that usually appears on the display screen as an angled arrow. The pointer is moveable via a pointing device to selectable items such as links, hyperlinks, universal resource locators, icons, command buttons, menu items, task bar items, scroll bar item and the like. A pointing device is a mouse, track ball, pad, track point device, joy stick, stylus, light pen, or other device that allows a user to input pointer movement and to select an item on the display.

The process of moving a GUI pointer to the desired selectable item by moving a pointing device may at times be tedious. Unintentional movements of the pointing input device often cause the pointer to drift away from the desired selectable time. Additionally, the required process is time-consuming. It is desirable to provide a method and computer system for rapid and accurate automatic vectoring of a graphical user interface pointer. Such a method and system should minimize pointer drifting and reduce the time and effort required to move the pointer manually.

SUMMARY OF THE INVENTION

The present invention comprises a method and computer system for controlling movement of a pointer on a graphical user interface display by automatically vectoring the pointer to a target item. One embodiment of the method receives a keyboard-based pointer movement input having a direction of travel on a display towards a target item, such as a link, hyperlink, universal resource locator, icon, command button, menu item, task bar item, tool bar item, scroll bar item, etc. Using a vectoring process, the invention vectors the pointer on the display to a located target item. The location of the target item from amongst possible target items on the display can be extrapolated based upon programmed limitations (e.g., user definable selectable items and/or sections on the display, a vector angle range, the relative closeness of each possible target item to either the direction of travel vector, the initial anchor position or both, etc.). In other words, upon receiving a direction of travel input, the control program locates the target item and jumps the pointer directly to that target item on the display. The keyboard-based pointer movement of this embodiment can include simultaneous operation of multiple keys on a keyboard such as the "Shift" key and one or more of the arrow keys on a keyboard.

Another embodiment of the method establishes vector sensitivity to limit pointer movement. The user establishes vector sensitivity by defining a vector angle range. The pointer movement input is received again via a keyboard-based input device or via another input device (e.g., a mouse, track ball, pad, track point device, stylus, joy stick, light pen, etc.) and a direction of travel vector is determined. The vector angle range is an angle that is bisected by the direction of travel vector. The intended target item may only be identified from amongst possible target items found within the area of the vector angle range and the pointer may thus only be vectored (i.e., jumped) to a target item within this area. Decreased sensitivity is established by defining a greater vector angle range, because this creates a broader area within which a target item on the display may be located and vice versa.

In another embodiment of the method the user may limit pointer movement by defining the items or the sections of the display to which the pointer may be automatically vectored. In another embodiment of the method the user may activate automatic selection of selectable items. Thus, once a pointer is vectored to a target item that item is automatically selected.

One embodiment of the computer system of the invention comprises a central processing unit with a graphical user interface and a display with selectable items (e.g., a link, hyperlink, universal resource locator, icon, command button, menu item, task bar item, tool bar item, scroll bar item, etc.) and a pointer. A pointer movement input device (e.g., a mouse, track ball, pad, track point device, stylus, joy stick, light pen, customized keyboard, etc.) operates in conjunction with the display and is used for inputting pointer movement. The computer system further comprises a controller that determines a direction of travel vector towards a target item based upon pointing device input, extrapolates the location of the target item, and moves the pointer to that target item. The process used to extrapolate the location of the target item from amongst possible target items can be based upon the direction of travel vector, vector sensitivity, additional user definable or default limits (e.g., user definable selectable items and/or sections of the display), and the relative closeness of each possible target item to either the direction of travel vector, the initial anchor position or both, etc. Lastly, a user may elect that the controller automatically selects a selectable target item upon moving the pointer to that target item.

These, and other, aspects and objects of the present invention will be better appreciated and understood when considered in conjunction with the following description and the accompanying drawings. It should be understood, however, that the following description, while indicating embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

Figure 1:
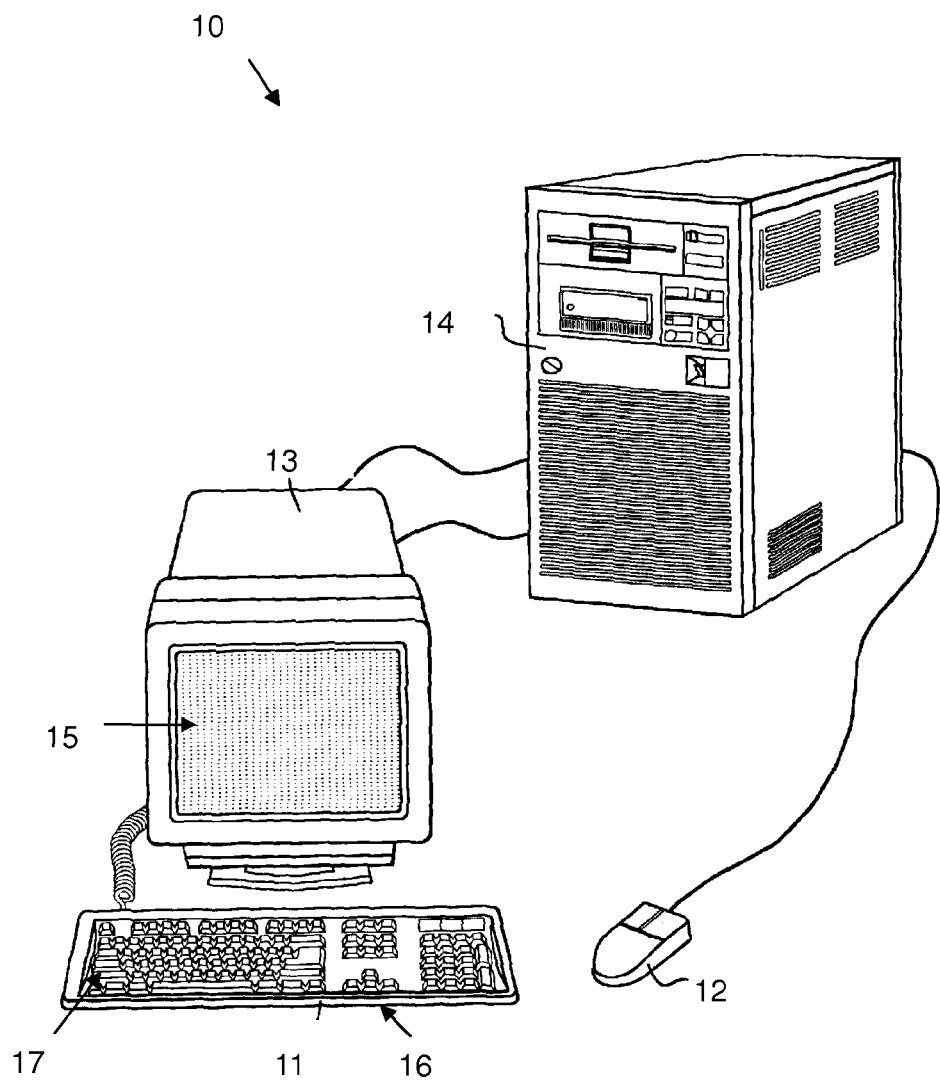
FIG. 1 is a schematic perspective view illustration of one embodiment of a computer system of the present invention.

The present invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

The present invention comprises a method and computer system for accurately controlling movement of a pointer on a graphical user interface display. The invention as described herein applies to all GUI based operating systems (e.g. Linux®, MS Windows®, Unix®, Apple Macintosh® etc.).

Figure 2:
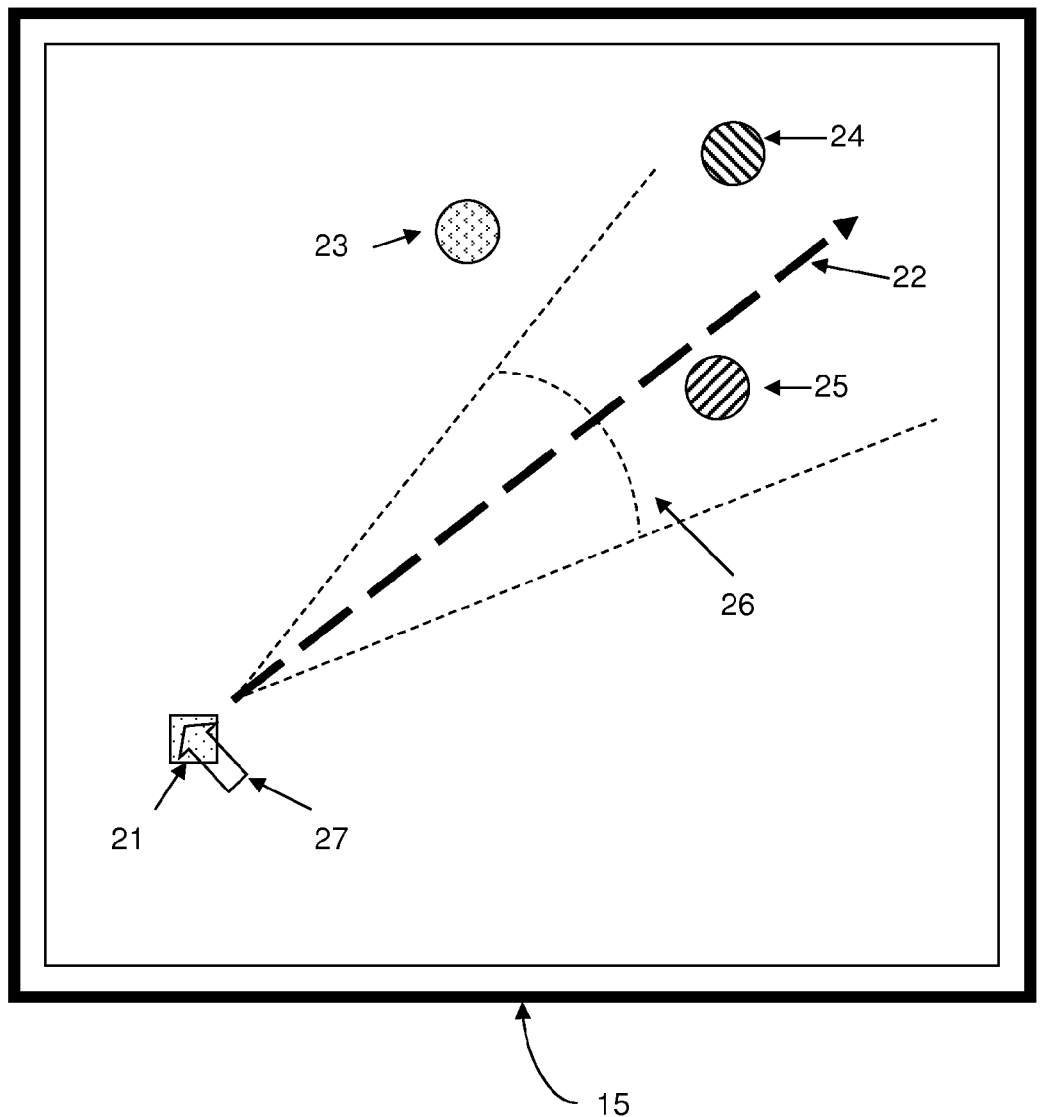
FIG. 2 is a schematic diagram illustrating an exemplary display.

FIG. 1 is a schematic perspective view illustration of an exemplary embodiment of a computer system 10 according to the present invention. The computer system 10 includes a central processing unit 14, a video monitor 13, an optional keyboard 11 and a pointing device 12. The system 10 further comprises a graphical user interface with a display 15 having selectable items (e.g., a link, hyperlink, universal resource locator, icon, command button, menu item, task bar item, tool bar, scroll bar item, etc.) and a pointer (also referred to as a cursor). The system 10 further comprises a software application having an automatic pointer position vectoring control program. The display 15 is illustrated in FIG. 2 and described in greater detail below. The exemplary computer system 10 illustrated in FIG. 1 comprises a personal computer; however, the invention may incorporate, but is not limited to, personal computers, laptops, workstations, or hand held computers including palm pilots, personal digital assistants, cellular telephones, smart telephones, etc. An exemplary pointing device 12 illustrated in FIG. 1 is a mouse; however, the pointing device may be, but is not limited to, other pointing devices (also referred to as pointer movement input devices) such as, track balls, touch pads, track point devices, styluses, joy sticks, light pens, customized keyboards 11, etc. The pointing device 12 operates in conjunction with the display 15 and is used for selecting pointer movement and in particular direction of travel.

Figure 3:
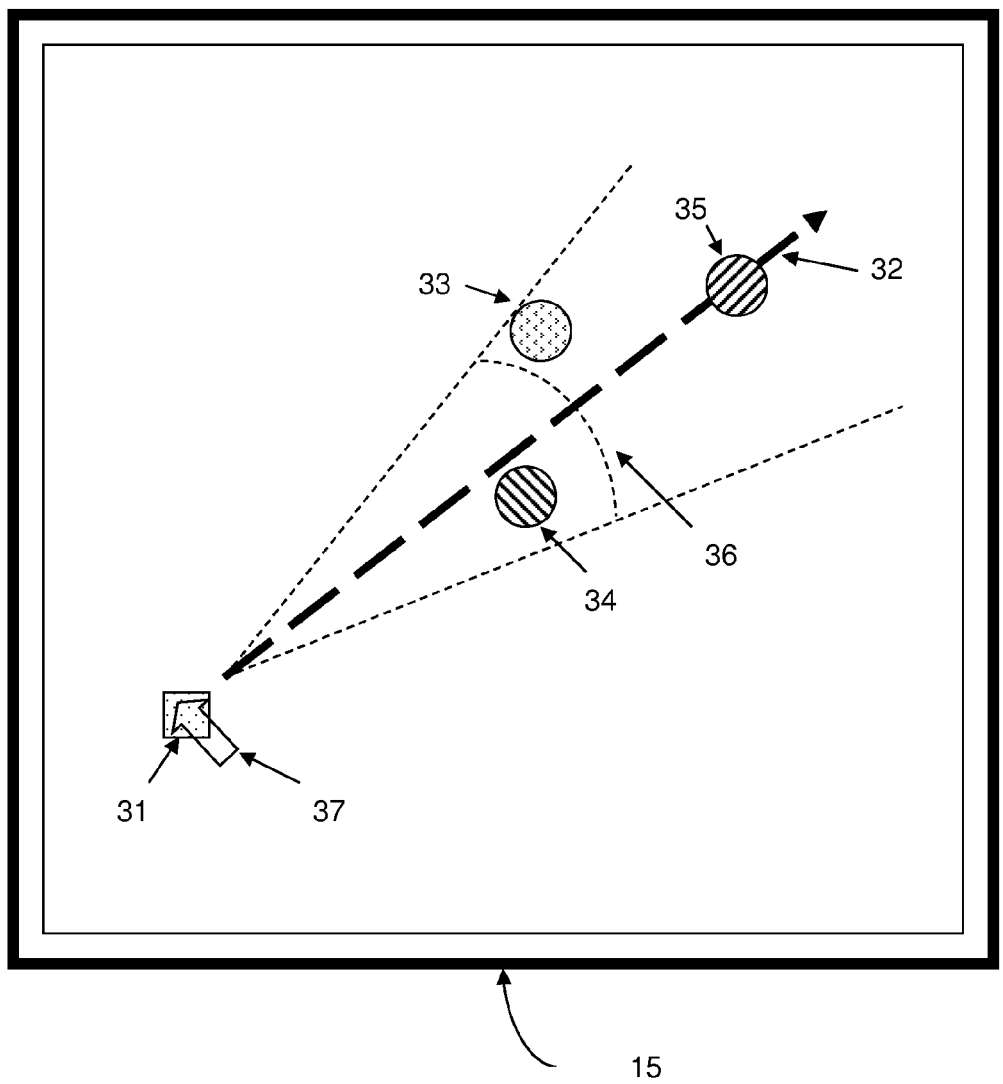
FIG. 3 is a schematic diagram illustrating another exemplary display.
Figure 4:
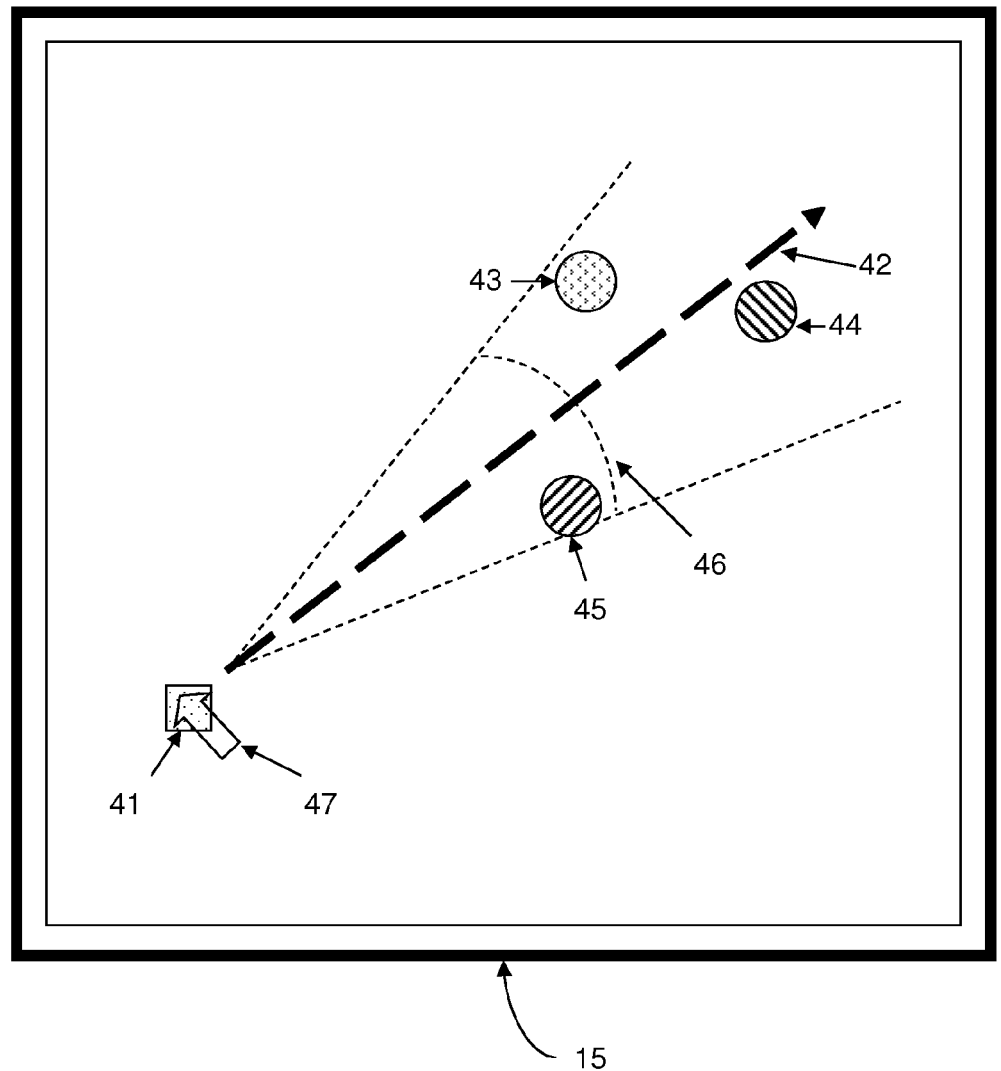
FIG. 4 is a schematic diagram illustrating another exemplary display.

FIGS. 2-4 illustrate exemplary displays 15. Referring to FIG. 2, displayed on the display screen 15 are multiple items 21, 23, 24 and 25. Items 23, 24 and 25 are possible target items. A pointer 27 as illustrated is positioned on an exemplary anchor or start position. Specifically, the pointer 27 is anchored on a selectable item 21. Vector 22 references the direction of travel vector of pointer 27 determined by the control program based upon pointing device 12 input towards a target item 25 away from the initial anchor position 21. The angle range 26 references a vector angle range bisected by the direction of travel vector 22 which effectively limits the area within which a target item may be located from amongst possible target items and within which the pointer 27 may be vectored by the automatic pointer position vectoring of the present invention. Referring to FIGS. 3 and 4, displayed on the display screen 15 are multiple items 31, 33, 34 and 35 and 41, 43, 44, and 45, respectively. Pointers 37 and 47 are set on anchor positions 31 and 41. Angles 36 and 46 reference the vector angle ranges bisected by said direction of travel vectors 32 and 42, respectively.

The vector (e.g., 22, 32 and 42) and vector angle range (e.g., 26, 36 and 46) may optionally be displayed on the display 15. For example, the user may select a feature that provides for the vector and/or vector angle range to be displayed once the direction of travel is determined and until the target item is selected.

As stated above, the computer system 10 of FIG. 1 includes a software application (control program or control means) for controlling the GUI pointer automatic positioning vectoring of the present invention. The control program is adapted to extrapolate the location of the target item and to move the pointer to the target item. More particularly, the process used to extrapolate the location or the identity of the target item from amongst possible target items can be based upon the direction of travel vector, the vector angle range, additional user definable limits (e.g., user definable selectable items and/or sections of the display), and the probability that the item is the intended target item based upon the relative closeness of each possible target item to either the direction of travel vector, the initial anchor position or both, etc. The closer a possible target item is to the initial anchor position and to the direction of travel vector the more likely it is to be the intended target item. One exception is that a possible target item located directly on the direction of travel vector, but further away from the initial anchor position than another possible target item not on the direction of travel vector, is more likely to be the intended target item. Therefore, the control program may be adapted to identify the intended target item as that item which is closest to the initial anchor position on the direction of travel vector. If no possible items are found on the direction of travel vector than the intended target item is identified as that item closest to both the initial anchor position and the direction of travel vector. For example, referring to FIG. 2, the location of the target item may be extrapolated as item 25 because it is within the vector angle range 26, it is the closest item to the initial anchor position 21 and it is the closest item to the direction of travel vector 22. Referring to FIG. 3, the location of the target item may be extrapolated as item 35 because while item 34 is closer to the anchor position 31, item 35 is located directly upon the direction of travel vector 32. Referring to FIG. 4, the location of the target item may be extrapolated as item 45 because the sum of the distance from the initial anchor position to the item (41→45; 41→44) plus the distance from the item to the direction of travel vector (45→42; 44→42) is lesser for item 45 than it is for item 44. Once the intended target item is located, the control program moves the pointer directly to that intended target item by skipping space on the display. In other words, the pointer jumps to the located intended target item without requiring further manipulation of the pointer device 12 and without traveling across the display 15.

Figure 5:
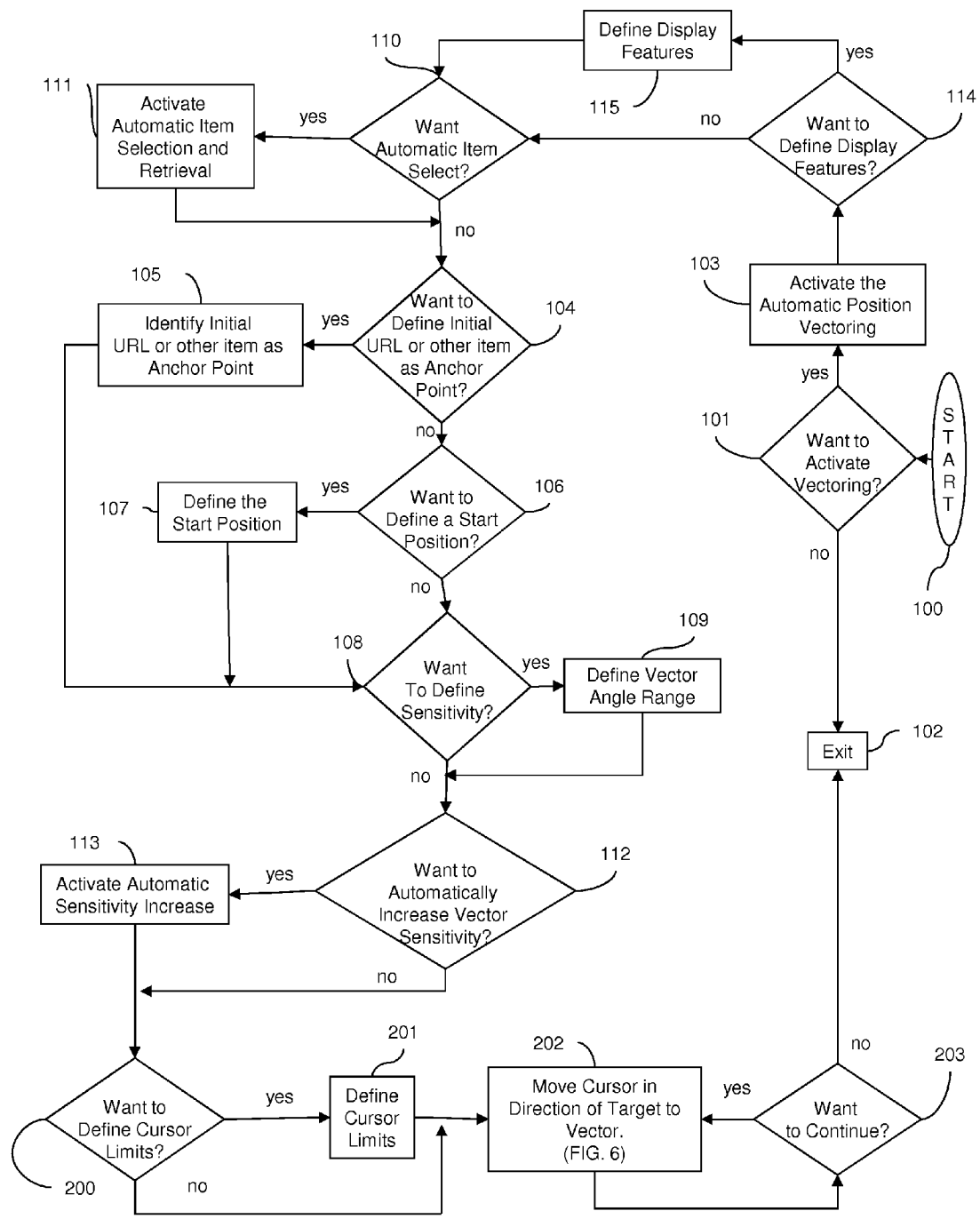
FIG. 5 is a flow diagram illustrating several embodiments of the present invention.

FIG. 5 is a flow diagram illustrating the general processes that may be utilized to carry out the various embodiments of the method of the present invention in conjunction with the computer system of FIG. 1. Referring in combination to FIGS. 1 through 5, after the computer system is started up 100, the user is presented with a display 15 and may select (e.g., from a menu item, tool bar, etc.) whether or not to activate automatic pointer position vectoring 101 (i.e., automatic pointer movement). If the user does not want to activate automatic pointer position vectoring, the user will exit the program at process 102.

As with other programs a user may exit 102 the automatic pointer position vectoring program by any number of methods. Exemplary exit methods include, but are not limited to, the following: clicking on a "Close" button (i.e., the square with an x in it at the top right of the program window); clicking a menu icon and selecting the "Close" option on the menu that scrolls down; using a the key sequence (e.g., Alt F4); clicking a "File" menu and then selecting the "Exit" option; right clicking the program's task bar button and selecting "Close" from a "Context" menu that opens; and, pressing the "Ctrl", "Alt", and "Del" keys simultaneously, opening up a menu of running programs, clicking on the program you want to close, and then clicking on the "End Task" button.

The user may also optionally define automatic pointer movement display features. If the user wants to define display features 114, the user may select from a drop down menu or other menu a feature that provides for defining display features 115. For example, the user may select that a vector and/or a vector angle range be visible on the display once the direction of travel is determined and until the target item is selected.

Upon activation of automatic pointer position vectoring 103, the control program will control pointer movement within the display according to default or user defined movement parameters (see method steps 104-105, 106-107, 108-109, 112-113 and 200-201) and user inputs 202. In general, a user inputs pointer movement 202 (e.g., input by moving a pointing device Ref. No. 120, FIG. 1) having a general direction of travel on a display towards a target item (i.e., Ref. No. 25, FIG. 2) away from the initial anchor position (i.e., Ref. No. 21, FIG. 2). Based upon this input the control program determines a direction of travel vector (i.e., Ref. No. 22, FIG. 2). The location of the intended target item from amongst possible intended target items can then be extrapolated and the pointer can be moved to the located intended target item. The process of automatically moving the pointer may be based in part upon default or user defined parameters (see processes 104-105, 106-107, 108-109, 112-113 and 200-201).

More particularly, once automatic pointer position vectoring is activated 100, the user has the option of inputting multiple user defined parameters to be used by the control program in identifying the intended target item, moving the pointer to the intended target item and selecting the target item.

For example, the user may indicate that automatic selection of a target item (e.g., link, hyperlink, universal resource locator, icon, command button, menu item, task bar item, scroll bar item, etc.; Ref. 250, FIG. 2) is desired once the pointer is moved to that item in order to retrieve the corresponding document, file webpage, web graphics, etc., or to initiate the command. If automatic selection of the target item is desired 110 automatic item selection and retrieval will be activated 111. Thus, no further manual operation (e.g., clicking of a button on the pointing device 12) by the user will be required once a pointer is moved to a target item (i.e., Ref. No. 25, FIG. 2). In one embodiment, the default setting may require manual selection of the acquired target item.

The user may also optionally define an initial anchor point or starting position for the pointer on the display 15 (see processes 104-105 and 106-107). The user has the option of defining a particular selectable item (e.g., Uniform Resource Locator (URL), a link, hyperlink, icon, etc.) as the anchor or start point (104-105). The user may alternatively define a particular location on the display 15 (e.g., lower right hand corner, center screen, etc.) as the initial anchor or start point (106-107). If the user does not want to define an initial anchor point or start position, the control program may define the current pointer position as the default position. The user may also optionally reset the default position. This initial anchor point or start position serves as the starting point from which the control program determines the direction of travel vector towards a target item based upon pointing device input.

In addition, the user may optionally define vector sensitivity (see processes 108-109). If the user wants to define sensitivity 108, defining sensitivity 109 may be accomplished by defining the vector angle range (see Ref. 26, FIG. 2). The control program uses this vector angle range 26 to limit the area within which it may to identify a target item from amongst possible target items and move the pointer to that located target item. The direction of travel vector (see Ref. 22, FIG. 2) beginning at the anchor point (see Ref. 21, FIG. 2) and pointing in the direction of the input pointer movement towards a target item bisects the vector angle range 26. Decreased sensitivity is established by defining a greater vector angle because this creates a broader area within which a target item on the display may be located. Increased sensitivity is established by defining a lesser vector angle because this creates a narrower area within which a target item on the display in may be located. Thus, depending on the particular display and the density of selectable items within the display, the user may choose to increase or decrease vector sensitivity. The control program may define the default vector sensitivity and may apply the default vector sensitivity if the user does not want to define vector sensitivity at process 108. The user may optionally reset the default.

The user may also optionally activate a feature of selectable automatic vector sensitivity (see processes 112-113). This feature automatically decreases the default or user defined vector angle range by a pre-selected dimension and is triggered if there are more than a pre-selected number of possible target items located within the vector angle range. Activating this feature, selecting the dimension by which the vector angle range is decreased and selecting the number of target items located within the vector angle range that triggers this automatic feature can be accomplished by using a drop down or other menu.

Similarly, the user may also define other limitations to automatic pointer movement controlled by the control program (see processes 200-201). If the user wants to limit automatic pointer movement 200, the user may define the particular type of selectable items to which a pointer may be moved or define the sections of the display which are active for purposes of automatic pointer position vectoring 201. As with the other user definable parameters, the control program may define default pointer movement limitations (e.g., no limitations, no automatic movement to toolbars, etc.) which are set if the user does not want to define cursor limits. The user may optionally reset the default settings or redefine the limitations depending upon the display.

Figure 6:
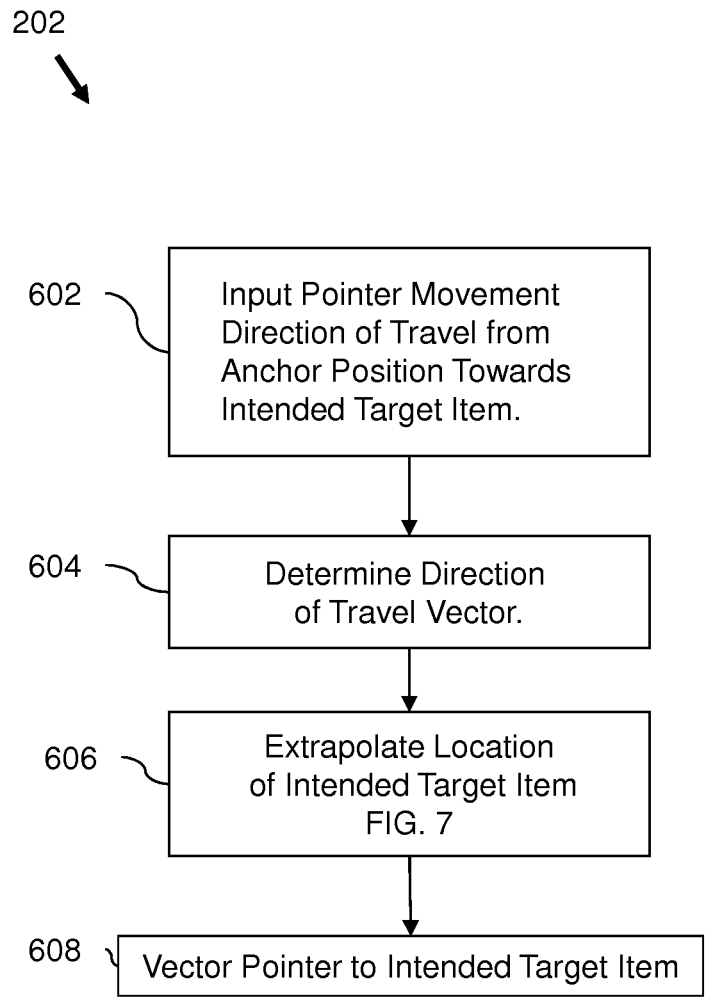
FIG. 6 is a flow diagram further illustrating a method process of FIG. 5.

As stated above, once the automatic pointer movement parameters are established (processes 104-105, 106-107, 108-109, 112-113 and 200-201), the user moves the pointing device and thus the pointer in the direction of the intended target item. The pointer is then automatically moved to that intended target item 202. FIG. 6 is a flow diagram further illustrating the process of automatically moving the pointer 202. In order to automatically move the pointer, the control program uses the vectoring parameters in conjunction with user input from a pointing device 12 having a general direction of travel on a display towards a target item (i.e., Ref. No. 25, FIG. 2). Based upon user pointing device input 602, the control program determines a direction of travel vector 604 away from the initial anchor position towards the intended target item, extrapolates the location of the intended target item 606 and automatically moves the pointer to that intended target item 608.

Figure 7:
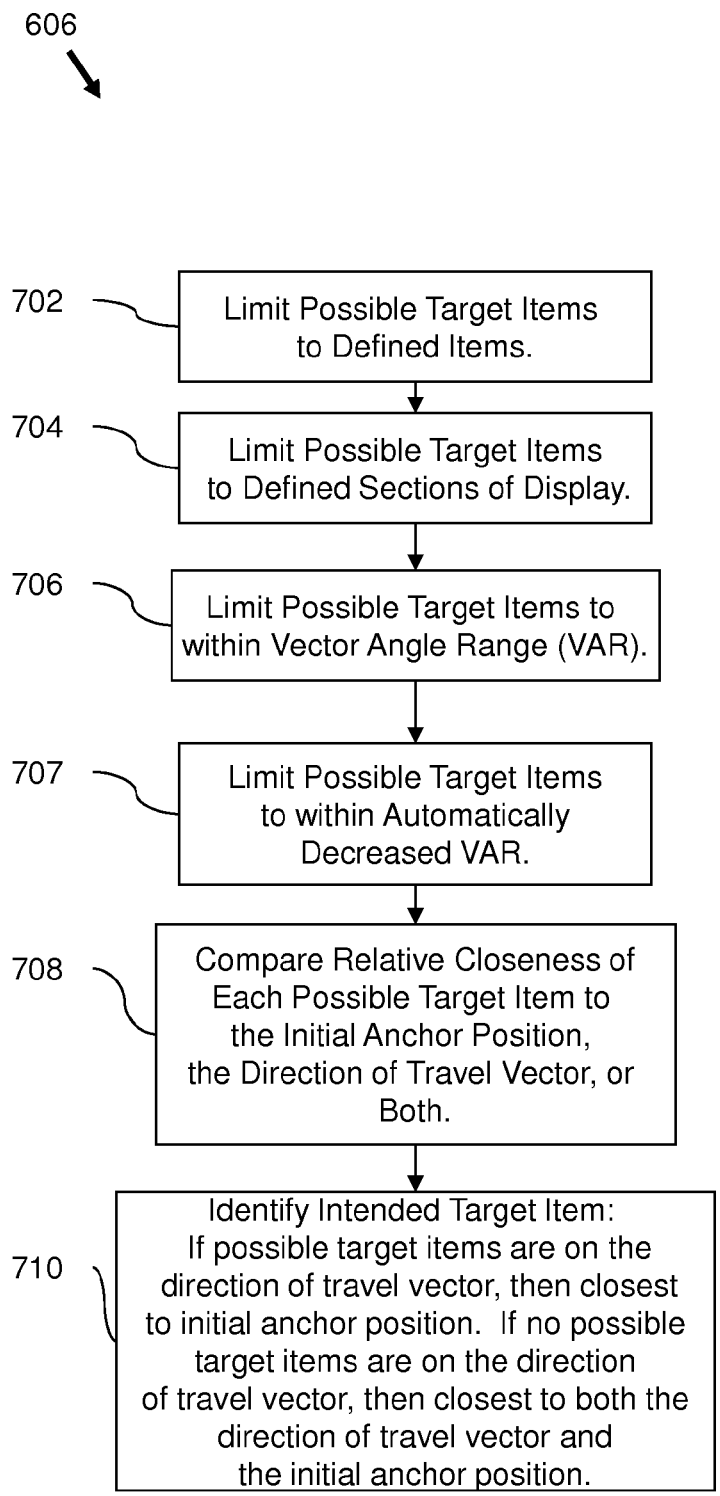
FIG. 7 is a flow diagram further illustrating a method process of FIG. 6.

FIG. 7 is a flow diagram further illustrating the process 606 of extrapolating the location of the intended target item. As discussed in detail above, the process used to extrapolate the location of the intended target item from amongst possible target items may be based upon a number of defined parameters. For example, possible intended target items may be limited to default or user defined selectable items 702. Possible intended target items may be limited to those items set within default or user defined sections of the display 704. Possible intended target items may further be limited to those items set within a default or user defined vector angle range 706. This vector angle range may automatically be decreased if more than a selected number of possible intended target items are found in the original vector angle range 707. Then, the relative closeness of each possible target item to the initial anchor position, the direction of travel vector, or both, is compared 708. The target item may further be identified 710 using automatic vectoring parameters defined based upon probabilities. For example, the closer a possible target item is to the initial anchor position and to the direction of travel vector the more likely it is to be the target item. One exception is that a possible target item located directly on the direction of travel vector, but further away from the initial anchor position than another possible target item not located on the direction of travel vector, is more likely to be the intended target item. Again referring to FIG. 6, once the location of the target item is identified, the control program automatically moves the pointer to that intended target item 608 by skipping space within the display without require additional manipulation of the pointing device.

After the pointer is moved to a target item, either the target item will be automatically selected due to activation of item selection and retrieval 111 or the user may optionally manually select the corresponding file, document, web page, etc. If the user wishes to continue using automatic pointer position vectoring 203, the user simply moves the pointer again 202. If the user does not wish to continue using automatic pointer position vectoring, the user exits the program 102 (see the exemplary exit methods discussed above).

Again referring in combination to FIGS. 1 through 5, one embodiment of the method of the present invention further defines the process of inputting pointer movement direction of travel towards a target item 202. Specifically, this method defines the pointing device as a keyboard-based pointing device (e.g., the arrow keys on a keyboard). For example, pointer movement may be selected by simultaneously operating multiple keys on a keyboard, such as the "Shift" key 17 and one or more of the arrow keys 16 on a keyboard 11. As with other pointing devices, input from arrow keys has a direction of travel on the display towards an intended target item from an initial anchor position. Once a direction of travel input is received, a direction of travel vector is determined. Based upon the direction of travel vector, the location of the intended target item is extrapolated and the pointer is automatically moved to that intended target item.

Figure 8:
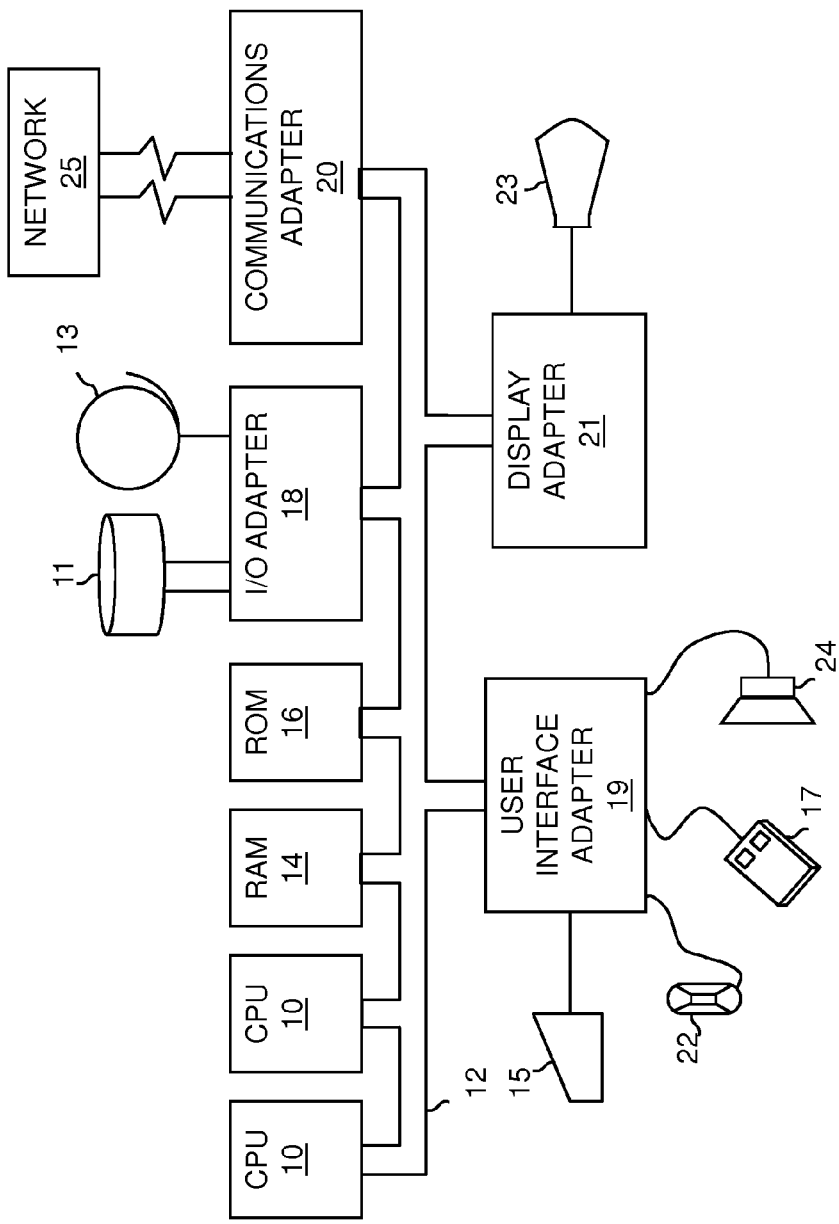
FIG. 8 is a schematic diagram illustrating an embodiment of the invention.

A representative hardware environment for practicing the embodiments of the invention is depicted in FIG. 8. This schematic drawing illustrates a hardware configuration of an information handling/computer system in accordance with the embodiments of the invention. The system comprises at least one processor or central processing unit (CPU) 810. The CPUs 810 are interconnected via system bus 812 to various devices such as a random access memory (RAM) 814, read-only memory (ROM) 816, and an input/output (I/O) adapter 818. The I/O adapter 818 can connect to peripheral devices, such as disk units 811 and tape drives 813, or other program storage devices that are readable by the system. The system can read the inventive instructions on the program storage devices and follow these instructions to execute the methodology of the embodiments of the invention. The system further includes a user interface adapter 819 that connects a keyboard 815, mouse 817, speaker 824, microphone 822, and/or other user interface devices such as a touch screen device (not shown) to the bus 812 to gather user input. Additionally, a communication adapter 820 connects the bus 812 to a data processing network 825, and a display adapter 821 connects the bus 812 to a display device 823 which may be embodied as an output device such as a monitor, printer, or transmitter, for example.

The method and computer system of the present invention provides for rapid and accurate automatic moving of a graphical user interface pointer to an intended target item on a display by extrapolating the location of the intended target item based upon default and/or user defined parameters and pointing device inputs. Once the location of the item is extrapolated the pointer is automatically moved to the item. As illustrated, the method and system minimizes pointer drifting and reduces the time and effort required to move the pointer manually.

While the invention has been described in terms of embodiments, those skilled in the art will recognize that the invention can be practiced with modification within the spirit and scope of the appended claims.

What is claimed is:
1. A computer system comprising:
a display for a graphical user interface;
an input device for said graphical user interface; and
a processor in communication with said input device and said display,
said processor receiving, from said input device, a pointer movement input,
said processor determining a direction of travel vector from an initial anchor position towards a single target item, said single target item being one of a plurality of possible target items on said display and said determining being based on said pointer movement input,
said processor limiting an area of said display within which said single target item may be located, said limiting comprising applying a vector angle range that has a vertex on said initial anchor position and that is bisected by said direction of travel vector,
said processor further automatically extrapolating a location of said single target item within said area, said extrapolating comprising identifying said single target item from amongst said possible target items within said area by:
determining, for each of said possible target items, a sum of a first distance between a possible target item and said initial anchor position plus a second distance between said possible target item and said direction of travel vector;
comparing each said sum for each of said possible target items; and determining which of said possible target items has a smallest sum so as to identify said single target item; and said graphical user interface automatically moving said pointer on said display to said single target item.

2. The computer system of claim 1, said vector angle range comprising one of a user-defined vector angle range and a default vector angle range.

3. The computer system of claim 1, said initial anchor position comprising one of a user-defined selectable item, a particular location on said display and a current location of said pointer.

4. The computer system of claim 1, said extrapolating further comprising limiting said possible target items to at least one of user-defined items and default-defined items located within said area.

5. The computer system of claim 1, said extrapolating further comprising limiting said possible target items to only items located within both said area and a defined section of said display.

6. The computer system of claim 1, said extrapolating further comprising identifying said single target item from amongst said possible target items as an item located on said direction of travel vector that is closest to said initial anchor position and, if no item is located on said direction of travel vector, then identifying said singe target item from amongst said possible target items as an item located closest to both said initial anchor position and said direction of travel vector.

7. The computer system of claim 1, said graphical user interface further automatically selecting said single target item, after said automatically moving of said pointer, so as to one of initiate a command and retrieve one of a corresponding document, file, and webpage.

8. The computer system of claim 1, said processor further automatically increasing vector sensitivity, before said extrapolating, by decreasing said vector angle range by a selected dimension, if there are more than a selected number of said possible target items located within said area.

9. A service for controlling movement of a pointer on a display, said service comprising:
receiving, from an input device of a graphical user interface, a pointer movement input;
determining, by a processor in communication with said graphical user interface, a direction of travel vector from an initial anchor position towards a single target item, said single target item being one of a plurality of possible target items on said display and said determining being based on said pointer movement input;
limiting, by said processor, an area of said display within which said single target item may be located, wherein said limiting comprises applying a vector angle range that has a vertex on said initial anchor position and that is bisected by said direction of travel vector;
automatically extrapolating, by said processor, a location of said single target item within said area, wherein said extrapolating comprises identifying said single target item from amongst said possible target items within said area by:
determining, for each of said possible target items, a sum of a first distance between a possible target item and said initial anchor position plus a second distance between said possible target item and said direction of travel vector;
comparing each said sum for each of said possible target items; and
determining which of said possible target items has a smallest sum so as to identify said single target item; and
automatically moving, by said graphical user interface, said pointer on said display to said single target item.

10. The service of claim 9, said vector angle range comprising one of a user-defined vector angle range and a default vector angle range.

11. The service of claim 9, said initial anchor position comprising one of a user-defined selectable item, a particular location on said display and a current location of said pointer.

12. The service of claim 9, said extrapolating further comprising limiting said possible target items to at least one of user-defined items and default-defined items located within said area.

13. A program storage device readable by a computer and storing a program of instructions executable by said computer to perform a method of controlling movement of a pointer on a display, said method comprising:
receiving, from an input device of a graphical user interface, a pointer movement input;
determining, by a processor in communication with said graphical user interface, a direction of travel vector from an initial anchor position towards a single target item, said single target item being one of a plurality of possible target items on said display and said determining being based on said pointer movement input;
limiting, by said processor, an area of said display within which said single target item may be located, wherein said limiting comprises applying a vector angle range that has a vertex on said initial anchor position and that is bisected by said direction of travel vector;
automatically extrapolating, by said processor, a location of said single target item within said area, wherein said extrapolating comprises identifying said single target item from amongst said possible target items within said area by:
determining, for each of said possible target items, a sum of a first distance between a possible target item and said initial anchor position plus a second distance between said possible target item and said direction of travel vector;
comparing each said sum for each of said possible target items; and
determining which of said possible target items has a smallest sum so as to identify said single target item; and
automatically moving, by said graphical user interface, said pointer on said display to said single target item.

14. The program storage device of claim 13, said vector angle range comprising one of a user-defined vector angle range and a default vector angle range.

15. The program storage device of claim 13, said initial anchor position comprising one of a user-defined selectable item, a particular location on said display and a current location of said pointer.

16. The program storage device of claim 13, said extrapolating further comprising limiting said possible target items to at least one of user-defined items and default-defined items located within said area.

17. The program storage device of claim 13, said extrapolating further comprising limiting said possible target items to only items located within both said area and a defined section of said display.

18. The program storage device of claim 13, said extrapolating further comprising identifying said single target item from amongst said possible target items as an item located on said direction of travel vector that is closest to said initial anchor position and, if no item is located on said direction of travel vector, then identifying said singe target item from amongst said possible target items as an item located closest to both said initial anchor position and said direction of travel vector.

19. The program storage device of claim 13, said method further comprising, after said automatically moving of said pointer, automatically selecting said single target item so as to one of initiate a command and retrieve one of a corresponding document, file, and webpage.

20. The program storage device of claim 13, said method further comprising, before said extrapolating, automatically increasing vector sensitivity by decreasing said vector angle range by a selected dimension, if there are more than a selected number of said possible target items located within said area.

* * * * *